F. G. SARGENT.
WOOL WASHING MACHINE AND THE LIKE.
APPLICATION FILED SEPT. 20, 1906.
961,023.
Patented June 7, 1910.
2 SHEETS—SHEET 1.
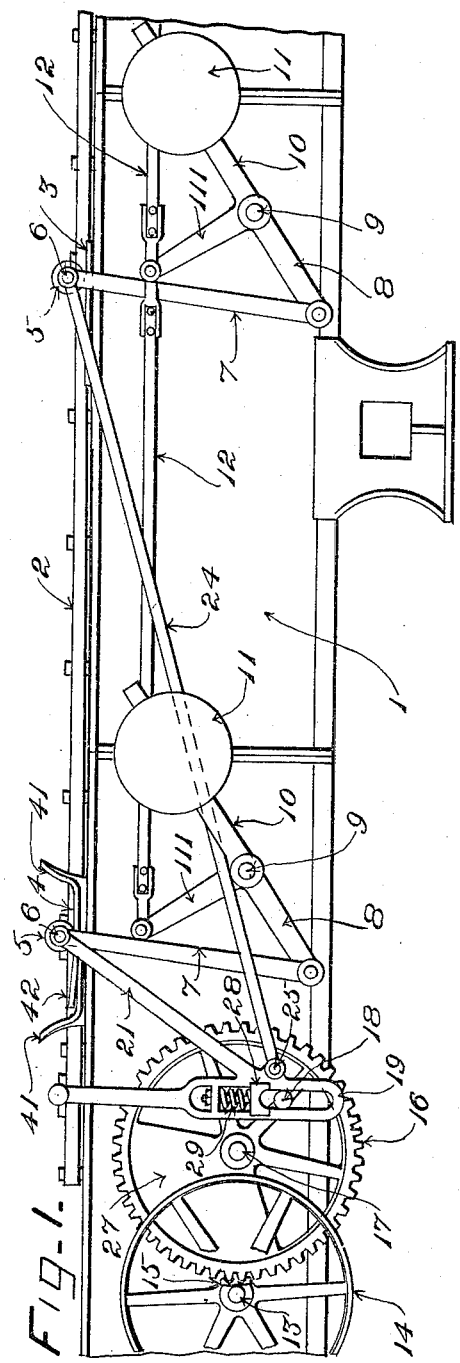
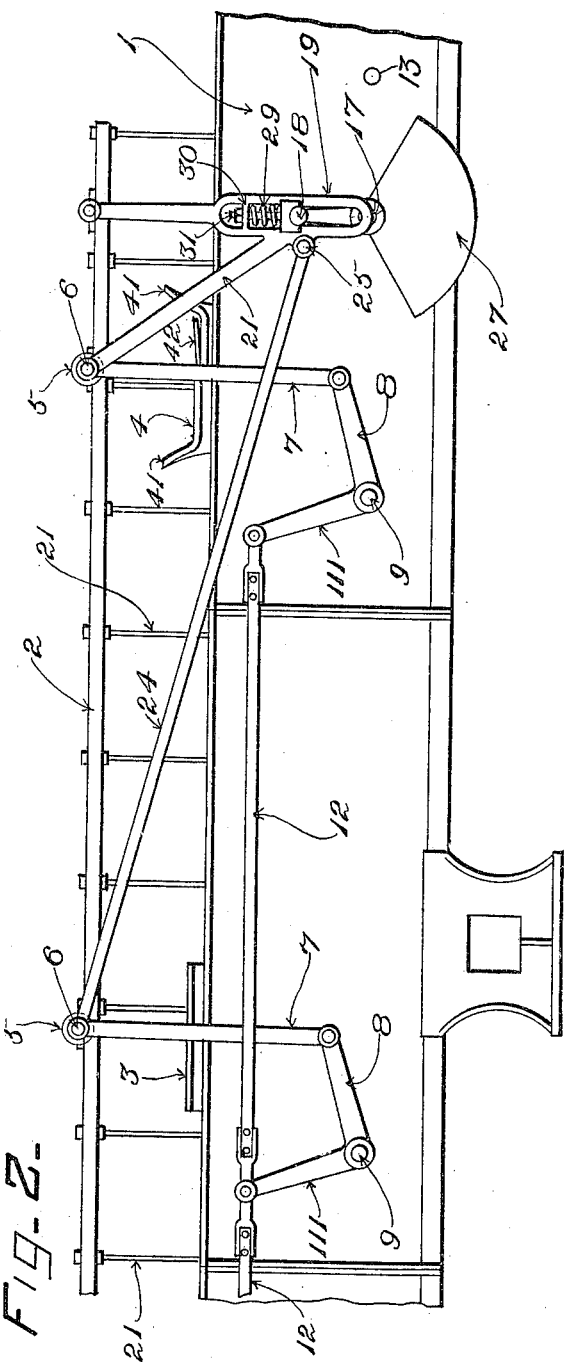
WITNESSES:
Oscar F. Hill
Edith J. Anderson.
INVENTOR
Frederick G. Sargent
BY
Chas. F. Randall
ATTORNEY F. G. SARGENT.
WOOL WASHING MACHINE AND THE LIKE.
APPLICATION FILED SEPT. 20, 1906.
961,023.
Patented June 7, 1910.
2 SHEETS—SHEET 2.
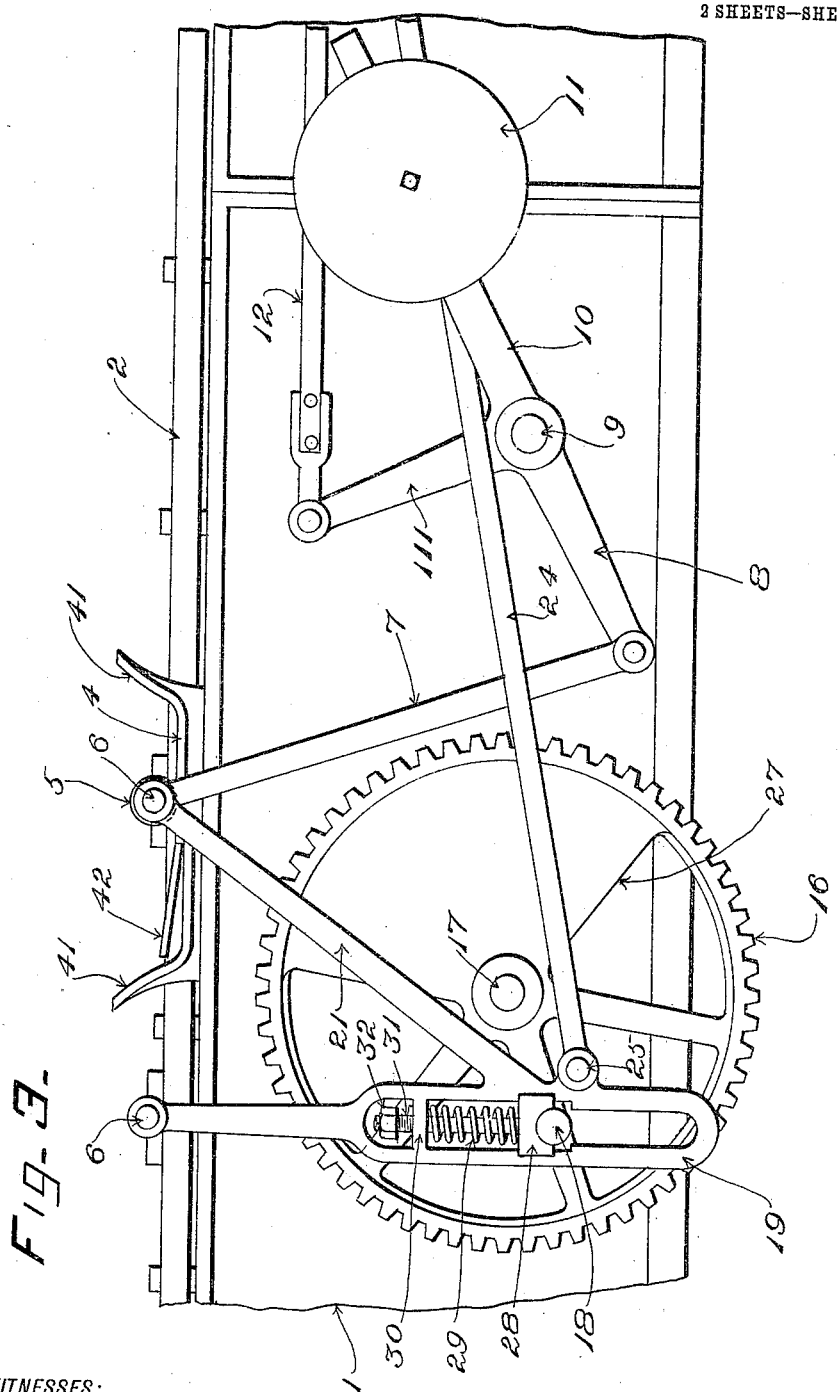
WITNESSES:
Oscar F. Hill
Edith J. Anderson.
INVENTOR
Frederick G. Sargent
BY
Chas. F. Randall
ATTORNEY

UNITED STATES PATENT OFFICE.

FREDERICK G. SARGENT, OF GRANITEVILLE, MASSACHUSETTS.

WOOL-WASHING MACHINE AND THE LIKE.

961,023. Specification of Letters Patent. Patented June 7, 1910.

Application filed September 20, 1906. Serial No. 335,349.

*To all whom it may concern:*

Be it known that I, FREDERICK G. SARGENT, a citizen of the United States, residing at Graniteville, in the county of Middlesex, State of Massachusetts, have invented a certain new and useful Improvement in Wool-Washing Machines and the Like, of which the following is a specification, reference being had therein to the accompanying drawings.

The invention relates, more particularly, to the mechanism that is employed for actuating the rake or harrow by which wool or other material under treatment is moved along within the bowl of a wool washing or other like machine.

One general object of the invention is to obviate the imposition of shock and strain upon the said mechanism in beginning to lift and while lifting the rake or harrow and lessen the strain thereon in lowering the rake or harrow.

Embodiments of the different features of the invention are shown in the drawings, and will be described with reference to the latter, in which,—

Figure 1 shows in side elevation a portion of a wool-washing machine, with the present invention applied thereto, certain small portions being broken away. Fig. 2 is an opposite side elevation of the said portion. Fig. 3 is a view showing a part of Fig. 1 on an enlarged scale.

A portion of a bowl of usual character is represented at 1. A portion of a harrow is represented at 2, it being provided as heretofore with teeth 21, 21, Fig. 2, working within the said bowl. The movements of the said harrow are as usual, it being advanced lengthwise from the leading or receiving end of the latter to the delivery or discharge end thereof, with its teeth immersed within the contents of the bowl, for the purpose of pushing forward within the bowl the material under treatment, then being raised at the conclusion of its advancing movement so as to withdraw its teeth from the said material, then being returned, with its teeth uplifted entirely above the said material, to the receiving or feeding end of the bowl, and then being lowered to cause its teeth to reëngage with the material contained in the bowl, these movements being repeated in continued succession.

At 3, 3, and 4, 4, are tracks which are mounted in fixed positions upon the opposite sides of the bowl, and 5, 5, are rollers which are mounted upon the cross-rods 6, 6, of the harrow, and which come to rest upon the said tracks when the harrow has descended from its elevated position, whereby the harrow is supported in its lowered position, the said rollers traveling along the tracks during the advancing movement of the harrow. Certain of the said tracks, namely those which are designated 3, 3, are shown as straight from end to end thereof, while others, namely those designated 4, 4, are shown formed with upturned ends 41, 41, as in the United States Letters Patent for improvement in wool washing machines granted to me May 28, 1901, No. 675,069. The tracks 4, 4, also, are shown furnished with upwardly inclined springs 42, 42, as in the said Letters Patent, operating as in the latter. In practice, all of the tracks may be straight, or all thereof may be provided with upturned ends, as preferred by the constructor or by the user.

At 7, 7, are rods or links extending downward from the cross-rods 6, 6, and connecting at their lower ends with the arms 8, 8, fixed upon the rock-shafts 9, 9, of the counterbalance mechanism, the said rock-shafts passing transversely through pipes or tubes extending across the lower portion of the bowl from side to side of the latter, each of the said rock-shafts having fast therewith an arm 10 carrying a weight 11 to counterbalance the weight of the harrow. Other arms 111, 111, which are fast upon the respective rock-shafts are joined to one another by rods 12, 12, extending lengthwise of the bowl and serving to cause the rock-shafts to work in unison, as in United States Letters Patent for improvement in wool washing machines granted to me June 26, 1894, No. 521,823.

The harrow-actuating means shown in the drawings comprises the power or driving shaft 13, Figs. 1 and 2, which extends crosswise of the bowl within a pipe or tube passing from side to side of the latter, substantially as in the case of the shafts 10, 10, and pipes or tubes 11, 11, of United States Letters Patent No. 521,823, dated June 26, 1894, a band-pulley 14, Fig. 1, fixed upon the said shaft 13, a spur-pinion 15 also fixed upon the said shaft between pulley 14 and the tank, a second shaft 17 extending transversely across the lower portion of the bowl through a similar tube or pipe fixed in the latter, a spur-gear 16 fast on said shaft 17 and meshing with the pinion 15 of the power or driving shaft, and crank-pins 18, 18, carried by the opposite ends of the said shaft 17 and engaging with the slotted connections 19, 19, extending downward from the harrow. One of the crank-pins is carried by the spur-gear 16, Figs. 1 and 3, the other is carried by an arm that is fixedly mounted upon the opposite end of the shaft 17, as represented in Fig. 2. Each of the connections 19 is formed with a slot within which works the corresponding crank-pin, and each thereof is formed or provided with a branch-portion, as 21, which extends obliquely upward from a point in proximity to the slot to the point where it is connected with the harrow, such point being in advance of that at which the main portion of the connection is joined to the harrow. The upper ends of the said main portion and branch are shown in engagement with cross-rods 6, 6.

The rakes or harrows of wool-washing and similar machines are of considerable length, being in some instances thirty-seven feet long. The actuating cranks are located adjacent one end of a rake or harrow, and the slotted connections (or harps, as they sometimes are termed,) are attached to the latter close to such end. As a result of these conditions, and of the inertia of the rake or harrow, as well as the momentum which it acquires during its longitudinal movement, and a certain degree of flexibility inherent in the structure of the rake or harrow, the action of the cranks against the side-walls of the slotted connections, in terminating the longitudinal movement in one direction and beginning that in the opposite direction, tends to bend or buckle the rake or harrow vertically, in addition to springing the slotted connections. To obviate these undesirable effects, by transmitting the operating force, and also the strains, from the slotted connections to points at a considerable distance toward the end of the rake or harrow opposite that at which the slotted connections are located and combined therewith, I employ a tie-rod 24, one extremity of which I join to the slotted connection at a point, as 25, alongside the slot, while the other extremity thereof I join to the harrow at a remote point, as for instance, by connecting such extremity to one of the more distantly located cross-rods 6, although such extremity may otherwise be connected with the harrow. The tie-rod forms an obtuse angle with the lower part of the slotted connection, and braces the same against springing in either direction, at the same time that by transmitting to a remote point of the harrow the force which tends to occasion longitudinal movement of the harrow, the tendency to spring or bend the longitudinal element of the harrow vertically is obviated.

The counterbalance weights 11, 11, employed heretofore in connection with the rockshafts 9, 9, facilitate the actuation of the harrow by the cranks by reducing the amount of unbalanced weight that has to be lifted by the cranks in raising the harrow, and that has to be sustained by the cranks in lowering the harrow. The said weights do not entirely counterbalance the harrow, there being a certain portion of the weight of the latter left unbalanced in order that such portion may act to occasion the descending movement of the harrow at the predetermined time in the rotation of the cranks. When this unbalanced portion of weight is picked up by the cranks as the latter begins to lift the harrow, a sudden strain is communicated to the crankshaft, its bearings, and the actuating mechanism for the cranks, such strain tending to occasion wear and to cause the bearings and other supports to work loose. To obviate this drawback, I provide the cranks with one or more counterbalances, as 27, rotating in unison therewith as by forming such counterbalances integral with the spur-gear 16 and with the arm of the opposite crank, or attaching the same thereto. By means of these counterbalances the strain and twisting heretofore occurring when the cranks pick up the unbalanced portion of the weight of the harrow are eliminated.

Within the slot of each connection 19 I employ a cap 28, against the curved under side of which the corresponding crank-pin bears in lifting and supporting the harrow. To prevent shock when the crank makes contact with the said cap in lifting the harrow, I employ a spring backing for the said cap. This spring backing is constituted by an expanding spiral spring 29 which is interposed between the top of the cap and a fixed cross-piece 30 forming a portion of the connection. A stud 31 projects upward from the cap, passing through the interior of the spring 29 and through a hole in the fixed cross-piece 30, and receiving upon its screw-threaded upper portion above the said cross-piece a nut 32. When the crank in moving upward strikes against the under side of the cap the said spring yields until the gradual increase of its tension due to compression becomes sufficiently great to bear upward the harrow. Thus shock is obviated in the lifting. When the crank in rotating downward lowers the harrow, the latter continues to be elastically upheld, and even when the trucks meet the tracks a portion of the weight of the harrow continues to be sustained by the spring until the continued rotation of the crank has carried it down far enough to substantially relieve the tension of the compressed spring. Thereby, the shock resulting when the harrow trucks come to rest upon the tracks is reduced.

I claim as my invention:—

1. The combination, in a wool-washing machine or the like, with the harrow, its slotted connection, the rotating crank working in the slot of the said connection, and the supporting tracks for the harrow, of the movable cap within the said slot, and the spring behind the said cap, whereby shock in lifting the harrow and in lowering it on to the tracks is obviated.

2. The combination, in a wool-washing machine or the like, with the harrow, its slotted connection, and the rotating crank working in the slot of said connection, of the counterbalance rotating in unison with the said crank and operating to prevent strain as the crank lifts the harrow.

3. The combination, in a wool-washing machine or the like, with the harrow, and a rotating crank in operative connection with said harrow by devices permitting lost-motion vertically, of a counterbalance rotating simultaneously with said crank and operating to reduce strain as the crank picks up the harrow.

4. The combination, in a wool-washing machine or the like, with the harrow, means for partially counterbalancing the weight thereof, and a rotating crank in operative connection with said harrow by devices permitting lost-motion vertically, of a counterbalance rotating simultaneously with said crank and operating to reduce strain as the crank picks up the harrow.

In testimony whereof I affix my signature in presence of two witnesses.

FREDERICK G. SARGENT.

Witnesses:
   CHAS. G. SARGENT,
   W. F. SARGENT.